United States Patent
Zhang et al.

(10) Patent No.: US 10,761,385 B2
(45) Date of Patent: Sep. 1, 2020

(54) LIQUID CRYSTAL ON SILICON PANEL HAVING LESS DIFFRACTION

(71) Applicants: Ming Zhang, Fremont, CA (US); Libo Weng, San Jose, CA (US); Cheng Zhao, San Jose, CA (US); Yin Qian, Milpitas, CA (US); Chia-Chun Miao, Sunnyvale, CA (US); Zhiqiang Lin, San Jose, CA (US); Dyson H. Tai, San Jose, CA (US)

(72) Inventors: Ming Zhang, Fremont, CA (US); Libo Weng, San Jose, CA (US); Cheng Zhao, San Jose, CA (US); Yin Qian, Milpitas, CA (US); Chia-Chun Miao, Sunnyvale, CA (US); Zhiqiang Lin, San Jose, CA (US); Dyson H. Tai, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/852,313

(22) Filed: Dec. 22, 2017

(65) Prior Publication Data

US 2019/0196284 A1  Jun. 27, 2019

(51) Int. Cl.
| | | |
|---|---|---|
| G02F 1/1362 | (2006.01) |
| G02F 1/1343 | (2006.01) |
| G02F 1/1337 | (2006.01) |
| G02F 1/1341 | (2006.01) |
| G02F 1/1339 | (2006.01) |
| G02F 1/1335 | (2006.01) |
| G02F 1/1333 | (2006.01) |

(52) U.S. Cl.
CPC ...... *G02F 1/136277* (2013.01); *G02F 1/1337* (2013.01); *G02F 1/1341* (2013.01); *G02F 1/13394* (2013.01); *G02F 1/13439* (2013.01); *G02F 1/133502* (2013.01); *G02F 2001/13398* (2013.01); *G02F 2001/133302* (2013.01); *G02F 2001/133357* (2013.01); *G02F 2001/133565* (2013.01)

(58) Field of Classification Search
CPC ................... G02F 1/136227; G02F 1/133345
See application file for complete search history.

(56) References Cited

U.S. PATENT DOCUMENTS

| | | |
|---|---|---|
| 6,774,955 B2 | 8/2004 | Chung et al. |
| 8,681,283 B2 | 3/2014 | Li et al. |
| 2007/0046880 A1* | 3/2007 | Shigeta ............. G02F 1/134336 349/138 |

(Continued)

FOREIGN PATENT DOCUMENTS

WO    WO01/95619    12/2001

*Primary Examiner* — Jessica M Merlin (57) ABSTRACT

A liquid crystal on silicon (LCOS) panel comprises: a silicon substrate having silicon circuit within the silicon substrate; a plurality of metal electrodes disposed on the silicon substrate, where the plurality of metal electrodes are periodically formed on the silicon substrate; a dielectric material disposed in and filling gaps between adjacent metal electrodes; and an oxide layer disposed on the plurality of metal electrodes and the dielectric material in the gaps between adjacent metal electrodes; where the refractive index of the dielectric material is higher than the refractive index of the oxide layer.

6 Claims, 10 Drawing Sheets

(56) References Cited

U.S. PATENT DOCUMENTS

| | | | |
|---|---|---|---|
| 2011/0090416 A1* | 4/2011 | Arasawa | H01L 29/4908 349/38 |
| 2013/0293818 A1 | 11/2013 | Murata et al. | |
| 2016/0246115 A1 | 8/2016 | Fan | |

* cited by examiner

LIQUID CRYSTAL ON SILICON PANEL HAVING LESS DIFFRACTION

FIELD OF THE INVENTION

This invention relates to a liquid crystal on silicon panel, and more specifically relates to a liquid crystal on silicon panel having less diffraction.

BACKGROUND OF THE INVENTION

Recently liquid crystal on silicon (LCOS) panels have a myriad of applications. An application is near eye display. The near eye display may be translucent and may not be translucent. The near eye display may be used in a 3D augmented reality (AR) and/or virtual reality (VR) display.

It is important for the eye to receive the intensity as much as possible from the LCOS panel. The LCOS panel includes periodical mirror like metal electrodes. There are gaps between adjacent metal electrodes. Some of light may be diffracted by the LCOS panel periodical structure, and thus the intensity of the image seen by the eye decreases.

Several attempts have been proposed to reduce the intensity diffracted by the LCOS panel periodical structure. An approach taken is to lay a high-reflection (HR) coating comprising multiple layers of different refractive indices on the top of the metal electrodes and the gaps between the metal electrodes. The high-reflection coating functions like a mirror. Since the high-reflection coating covers metal electrodes and the gaps between metal electrodes, the incident light is reflected by the high-reflection coating, and no diffraction occurs. However, the thickness of the high-reflection coating may affect the electric field generated between the metal electrodes and the counterpart electrodes, such that the contrast ratio of the light modulated by the LCOS panel decreases.

Accordingly, a LCOS panel having less diffraction without sacrificing the contrast ratio is in demand.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
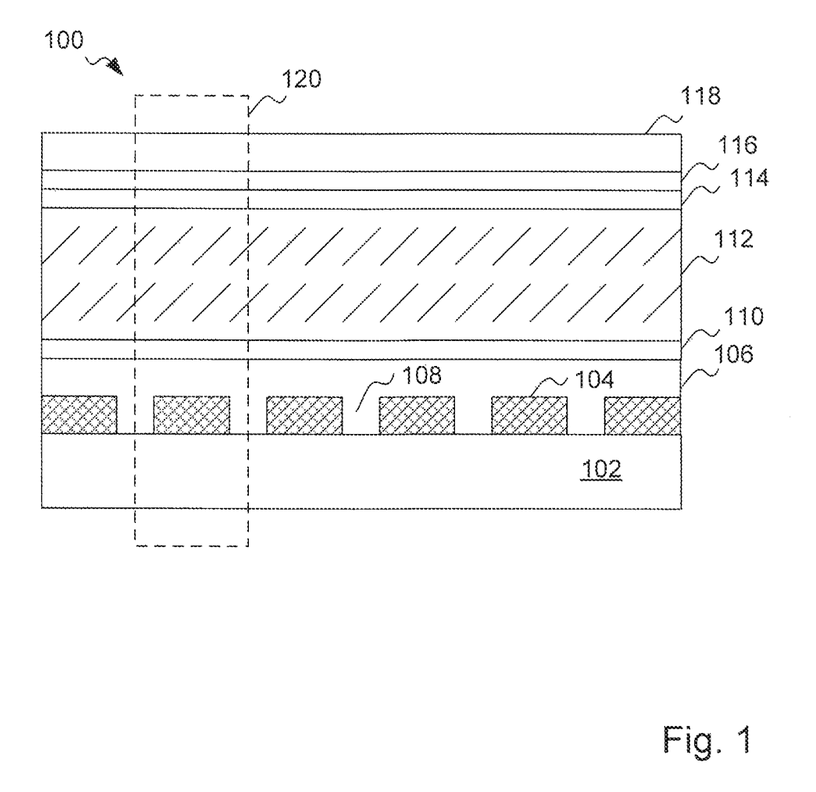
FIG. 1 illustrates schematically a LCOS panel.

FIG. 1 illustrates schematically a LCOS panel 100. LCOS panel 100 comprises a silicon substrate 102 having silicon circuit within the substrate. A plurality of metal electrodes 104 are disposed on silicon substrate 102. Metal electrodes 104 are periodically formed on silicon substrate 102. An oxide layer 106 is disposed on metal electrodes 104. Oxide layer 106 may be silicon oxide. Oxide layer 106 also fills gaps 108 between adjacent metal electrodes 104. A first liquid crystal alignment layer 110 is disposed on oxide layer 106. A liquid crystal layer 112 is disposed on first liquid crystal alignment layer 110.

A transparent continuous electrode 116 is coated on a glass substrate 118. Second liquid crystal alignment layer 114 is disposed on transparent continuous electrode 116. Glass substrate 118 together with transparent continuous electrode 116 and second liquid crystal alignment layer 114 are disposed on liquid crystal layer 112, where second liquid crystal alignment layer 114 is immediately adjacent to liquid crystal layer 112.

Each metal electrode 104 and transparent continuous electrode 116 form a pixel 120 of LCOS panel 100. Transparent continuous electrode 116 may be a counterpart electrode of a metal electrode 104.

Figure 2:
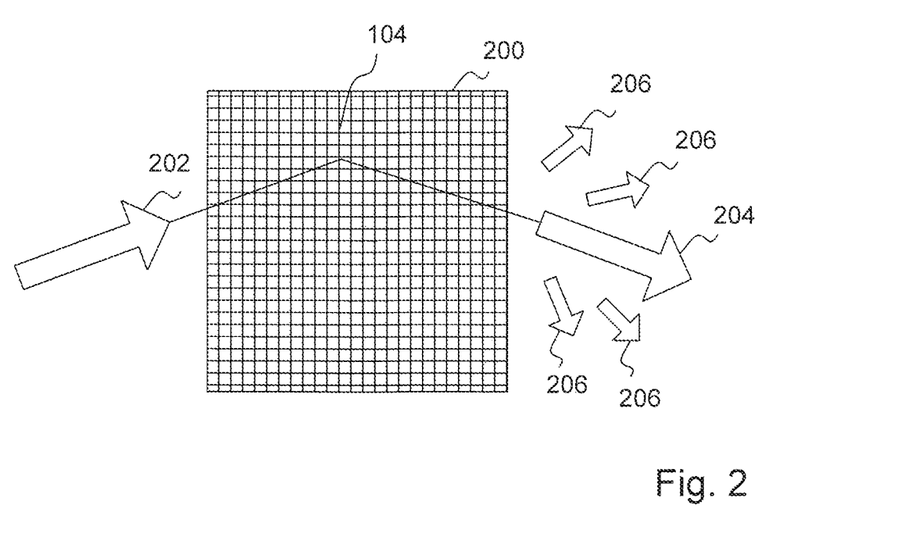
FIG. 2 illustrates schematically a LCOS panel in off state illuminated by a collimated laser beam, according to an embodiment of the present invention.

FIG. 2 illustrates schematically LCOS panel 200 in off state illuminated by a collimated laser beam 202, according to an embodiment of the invention. Laser beam 202 is diffracted by LCOS panel 200 comprising a periodical structure of metal electrodes 104. Diffracted laser beams comprise a zero order diffraction beam 204 and four first order diffraction beams 206.

Figure 3:
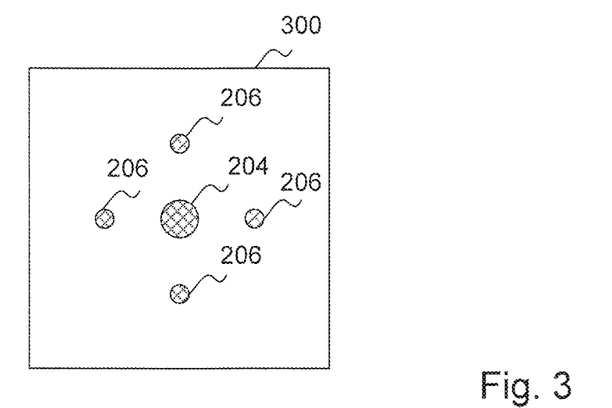
FIG. 3 illustrates schematically a screen showing a zero order diffraction beam and four first order diffraction beams, according to an embodiment of the present invention.

FIG. 3 illustrates schematically a screen 300 showing zero order diffraction beam 204 and four first order diffraction beams 206, according to an embodiment of the invention. Diffraction Ratio (DR) is defined as follows.

$$DR = \frac{0^{th} \text{ order intensity}}{\sum_{1}^{4} 1^{st} \text{ order intensity}} \quad (1)$$

Figure 4:
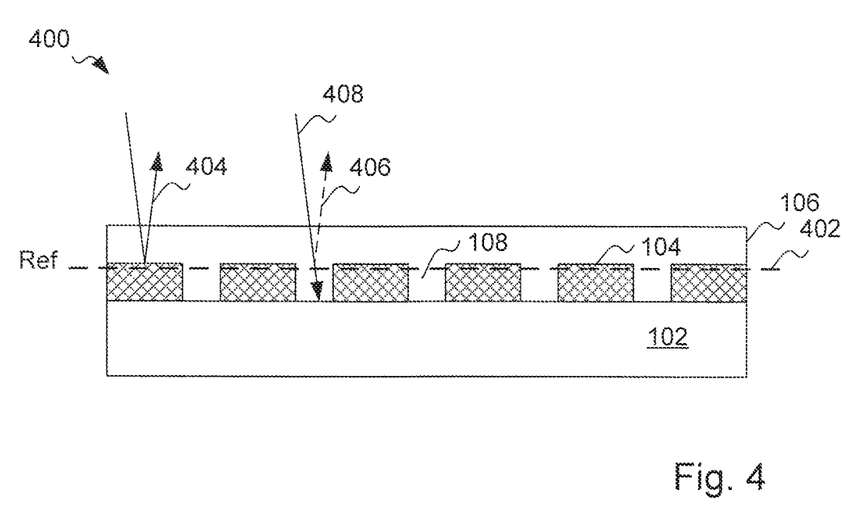
FIG. 4 illustrates schematically a silicon backplane of LCOS panel.

FIG. 4 illustrates schematically a LCOS silicon backplane 400 of LCOS panel 100 of FIG. 1. A reference line 402 is at the top of metal electrodes 104. In an embodiment, an amplitude of a reflected light 404 at reference line 402 and at metal electrode 104 is unity. An amplitude of a reflected light 406 at reference line 402 and at gaps 108 is zero, because an incident light 408 at reference line 402 and at gap 108 is transmitted to silicon substrate 102.

Figure 5:
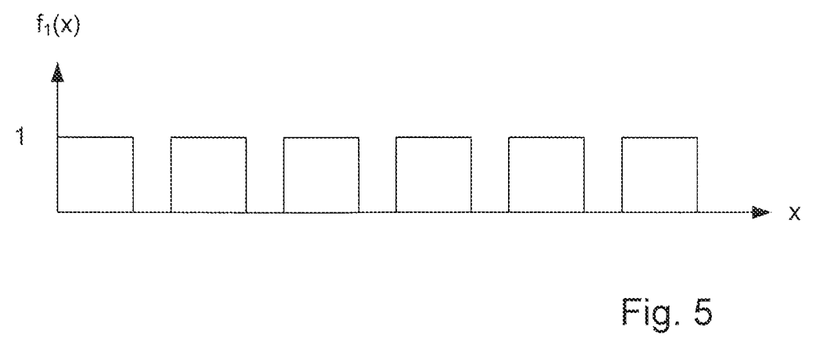
FIG. 5 illustrates a function $f_1(x)$, which represents the amplitude of the reflected light at a reference line, x is the dimension showing the location of the metal electrodes and the gaps, according to an embodiment of the present invention.

FIG. 5 illustrates a function $f_1(x)$, which represents the amplitude of the reflected light at reference line 402, x is the dimension showing the location of metal electrodes 104 and gaps 108, according to an embodiment of the invention. According to the diffraction theory, the intensity of the zero order diffraction beam is given as follows.

Intensity of Zero Order=|Amplitude of Zero Order|²     (2)

[Amplitude of Zero Order]₁=∫f₁(x)dx     (3)

Figure 6:
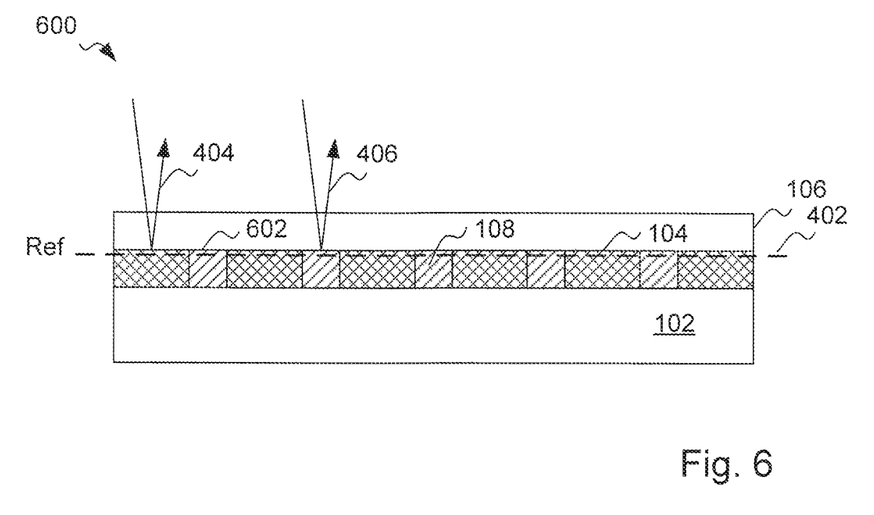
FIG. 6 illustrates schematically a silicon backplane of LCOS panel, according to an embodiment of the present invention.

FIG. 6 illustrates schematically a LCOS silicon backplane 600, according to an embodiment of the invention. LCOS silicon backplane 600 comprises a silicon substrate 102 having silicon circuit within the substrate. A plurality of metal electrodes 104 are disposed on silicon substrate 102. Metal electrodes 104 are periodically formed on silicon substrate 102. Each metal electrode is electrically isolated from other metal electrodes. A dielectric material 602 is disposed in and fills gaps 108 between adjacent metal electrodes 104. Metal electrodes 104 and dielectric material 602 in gaps 108 have the same thickness. An oxide layer 106 is disposed on metal electrodes 104 and dielectric material 602. A refractive index of dielectric material 602 is higher than a refractive index of oxide layer 106. Oxide layer 106 may be silicon oxide. Dielectric material 602 may be silicon oxynitride.

Similar to FIG. 1 but not shown in FIG. 6, a first liquid crystal alignment layer 110 may be disposed on oxide layer 106 of LCOS silicon backplane 600. A liquid crystal layer 112 may be disposed on first liquid crystal alignment layer 110. A transparent continuous electrode 116 is coated on a glass substrate 118. Second liquid crystal alignment layer 114 is disposed on transparent continuous electrode 116. Glass substrate 118 together with transparent continuous electrode 116 and second liquid crystal alignment layer 114 are disposed on liquid crystal layer 112, where second liquid crystal alignment layer 114 is immediately adjacent to liquid crystal layer 112. Each metal electrode 104 and transparent continuous electrode 116 may form a pixel 120 of LCOS panel. Transparent continuous electrode 116 may be a counterpart electrode of a metal electrode 104.

A reference line 402 is at the top of metal electrodes 104. In an embodiment, an amplitude of a reflected light 404 at reference line 402 and at metal electrode 104 is unity. An amplitude of a reflected light 406 at reference line 402 and at gaps 108, which is an interface between dielectric material 602 and oxide layer 106 is given in Equation (4). Light is incident from oxide layer 106 to dielectric material 602.

$$\text{Amplitude Reflectance} = \frac{(n_{Dielectric} - n_{Oxide})}{(n_{Dielectric} + n_{Oxide})} \quad (4)$$

In an embodiment, dielectric material 602 may be silicon oxynitride having refractive index 2.2, and oxide layer 106 may be silicon oxide having refractive index 1.46. Accordingly, Equation (4) above becomes as follows.

$$\text{Amplitude Reflectance} = \frac{(2.2 - 1.46)}{(2.2 + 1.46)} = 0.20 \quad (5)$$

Figure 7:
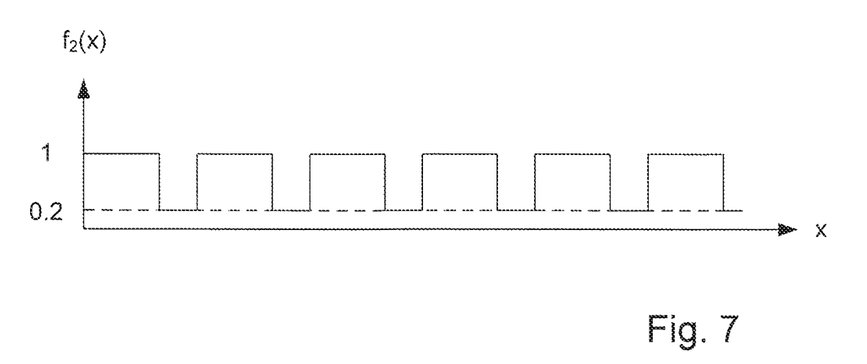
FIG. 7 illustrates a function $f_2(x)$, which represents the amplitude of the reflected light at a reference line, x is the dimension showing the location of the metal electrodes and the gaps, according to an embodiment of the invention.

FIG. 7 illustrates a function $f_2(x)$, which represents the amplitude of the reflected light at reference line 402, x is the dimension showing the location of metal electrodes 104 and gaps 108, according to an embodiment of the invention. Function $f_2(x)$ differs from function $f_1(x)$. The amplitude reflectance at gaps 108 is not zero, but a positive number AR, 0<AR<1, which may be 0.20 in an embodiment. According to the diffraction theory, the intensity of the zero order diffraction beam is given as follows.

Intensity of Zero Order=|Amplitude of Zero Order|²     (6)

[Amplitude of Zero Order]₂=∫f₂(x)dx     (7)

Comparing $f_2(x)$ of FIG. 7 and $f_1(x)$ of FIG. 5, since the gaps in $f_2(x)$ have a value 0.2, and the gaps in $f_1(x)$ have a value of zero, the following result holds.

∫f₂(x)dx>∫f₁(x)dx     (8)

Accordingly, the intensity of zero order of the embodiment having high refractive dielectric materials filling the gaps between the electrodes is higher than the intensity of zero order of the embodiment having the same oxide layer filling the gaps between the electrodes.

Furthermore, the diffraction ratio as defined in Equation (1) of the embodiment having high refractive dielectric materials filling the gaps between the electrodes is higher than the diffraction ratio of the embodiment having the same oxide layer filling the gaps between the electrodes. In other words, the LCOS panel having high refractive dielectric materials filling the gaps between the electrodes as shown in FIG. 6 has less diffraction as compared with the LCOS panel having the same oxide layer filling the gaps between the electrodes as shown in FIG. 4 or FIG. 1.

A thickness of oxide layer 106 in the embodiment having high refractive dielectric materials filling the gaps between the electrodes (FIG. 6) is the same as a thickness of oxide layer 106 in the embodiment having the same oxide layer filling the gaps between the electrodes (FIG. 4). For example, the thickness of oxide layer 106 may be 0.05 µm. Therefore, the magnitude of the electric field generated between metal electrode 104 and transparent electrode 116 is not changed or affected. Accordingly, embodiment 600 of FIG. 6 does not change or sacrifice the contrast ratio of the LCOS panel but increases the diffraction ratio of the LCOS panel.

Figure 8A:
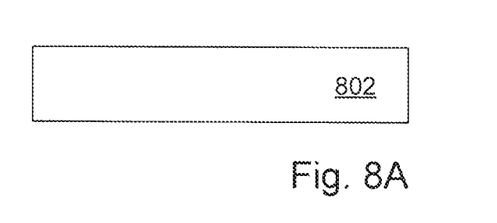
FIG. 8A to FIG. 8I illustrate schematically a process of manufacturing liquid crystal panel having high diffraction ratio, according to an embodiment of the invention.
Figure 8B:
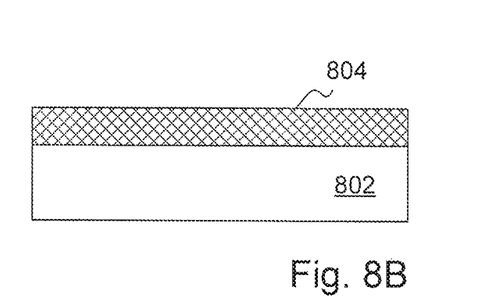
Figure 8C:
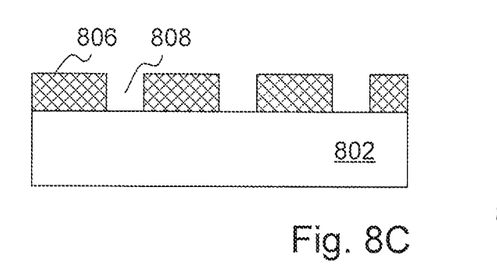

FIG. 8A to FIG. 8I illustrate schematically a process of manufacturing liquid crystal panel having high diffraction ratio, according to an embodiment of the invention. The process starts with a silicon substrate 802 as shown in FIG. 8A. Silicon substrate 802 may comprise silicon circuits within substrate 802. A metal layer 804 is formed on silicon substrate 802 as shown in FIG. 8B. For example, the thickness of metal layer 804 may be 0.3 μm. Metal layer 804 is etched to form individual electrodes 806 as shown in FIG. 8C. Each metal electrode is electrically coupled with the circuit within silicon substrate 802 to form a pixel of the LCOS panel. Each metal electrode is electrically isolated from other metal electrodes. A gap 808 is formed between adjacent metal electrodes 806. For example, gap 808 is 0.2 μm wide.

Figure 8D:
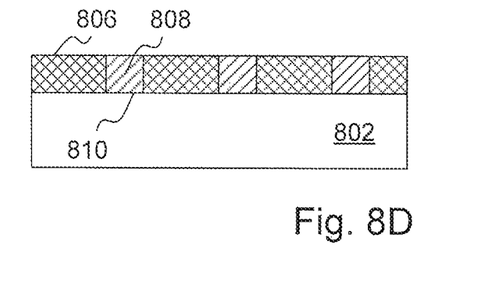
Figure 8E:
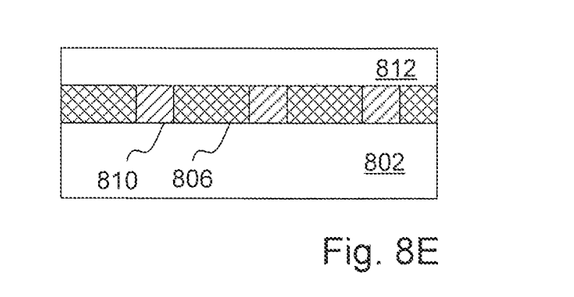
Figure 8F:
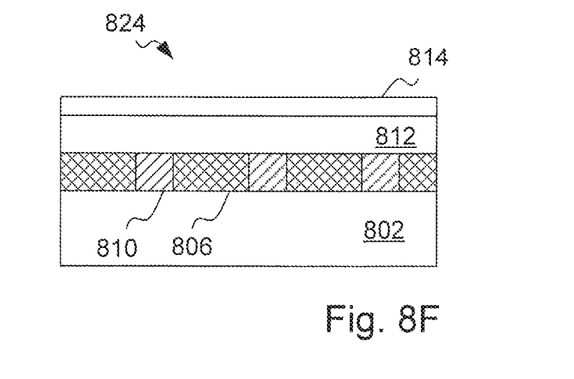

A dielectric material 810 fills gaps 808 as shown in FIG. 8D. After a planarization process, metal electrodes 806 and dielectric material 810 in gaps 808 have the same thickness. For example, the thickness may be 0.3 μm. An oxide layer 812 is disposed on metal electrodes 806 and dielectric material 810 as shown in FIG. 8E. For example, the thickness of oxide layer 812 may be 0.05 μm. The refractive index of dielectric material 810 is higher than the refractive index of oxide layer 812. A first liquid crystal alignment layer 814 is disposed on oxide layer 812 as shown in FIG. 8F. FIG. 8F shows a silicon backplane 824 comprising silicon substrate 802, metal electrodes 806, high refractive index dielectric material 810, oxide layer 812, and first liquid crystal alignment layer 814. For the sake of simplicity, first liquid crystal alignment layer 814 is considered a part of silicon backplane 824.

Figure 8G:
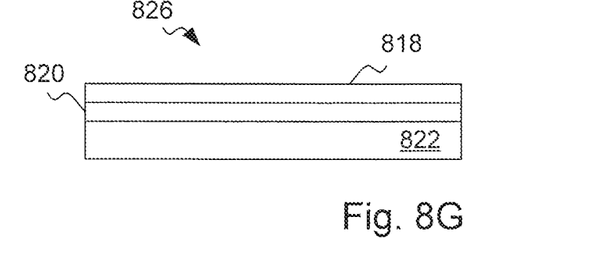
Figure 8H:
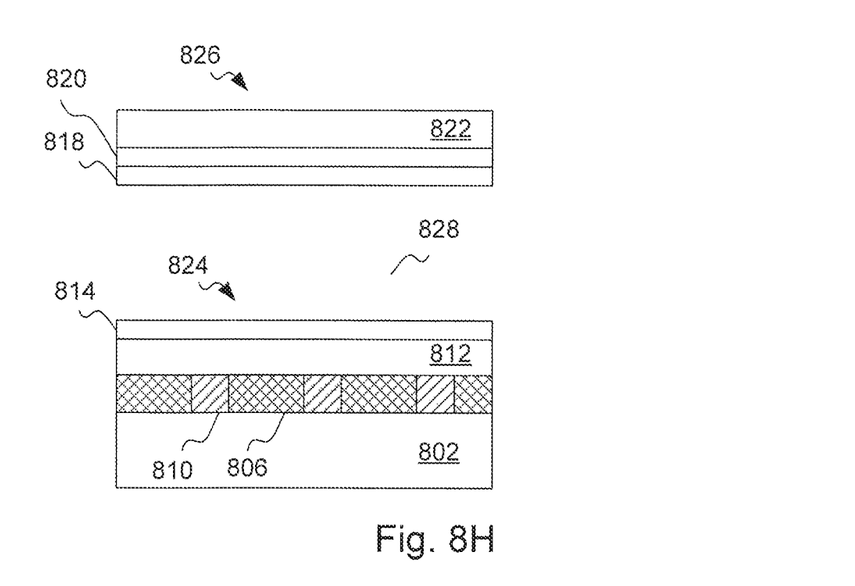

FIG. 8G shows a cover glass 826 comprising a glass substrate 822. A transparent continuous electrode 820 is coated on glass substrate 822. A second liquid crystal alignment layer 818 is disposed on transparent continuous electrode 820. For the sake of simplicity, second liquid crystal alignment layer 818 is considered a part of cover glass 826. FIG. 8H shows that cover glass 826 is turned up side down, and is laminated on silicon backplane 824 having spacing 828 between cover glass 826 and silicon backplane 824. Second liquid crystal alignment layer 818 is facing first liquid crystal alignment layer 814.

Figure 8I:
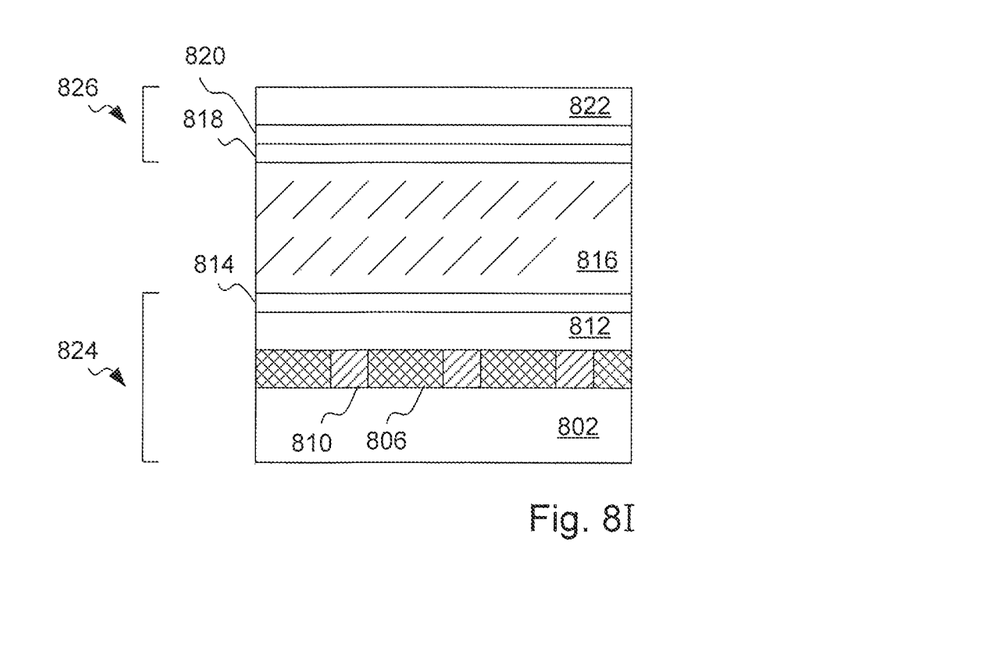

FIG. 8I shows that a liquid crystal layer 816 is formed by filling liquid crystal in spacing 828 between cover glass 826 and silicon backplane 824. Spacing 828 is shown in FIG. 8H. For example, the thickness of liquid crystal alignment layers 814 and 818 may be 0.025 μm, the thickness of liquid crystal layer 816 may be 1.1 μm, and the thickness of transparent continuous electrode 820 may be 0.04 μm.

Figure 9:
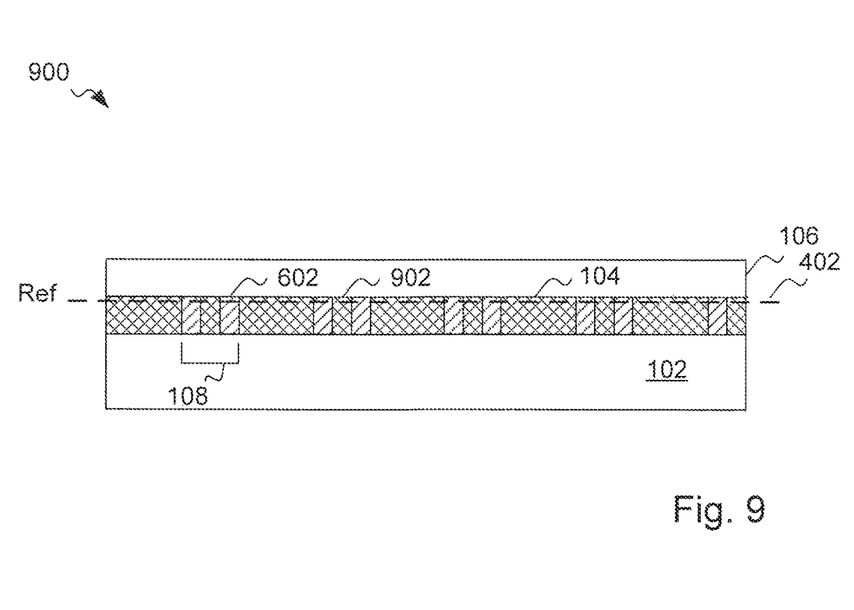
FIG. 9 illustrates schematically a silicon backplane of LCOS panel, according to an embodiment of the present invention.

FIG. 9 illustrates schematically a LCOS silicon backplane 900, according to an embodiment of the invention. LCOS silicon backplane 900 of FIG. 9 is similar to LCOS silicon backplane 600 of FIG. 6, except gap 108 is filled with a metal pillar 902 surrounding by dielectric material 602. In an embodiment, metal pillar 902 has an amplitude reflectance of unity. Metal pillar 902 is electrically isolated from adjacent electrodes 104 forming gaps 108. Metal electrodes 104, metal pillars 902 and dielectric material 602 in gaps 108 have the same thickness. Similar to LCOS silicon backplane 600, dielectric material 602 may be silicon oxynitride having refractive index 2.2, and oxide layer 106 may be silicon oxide having refractive index 1.46. A refractive index of dielectric material 602 is higher than a refractive index of oxide layer 106.

Figure 10:
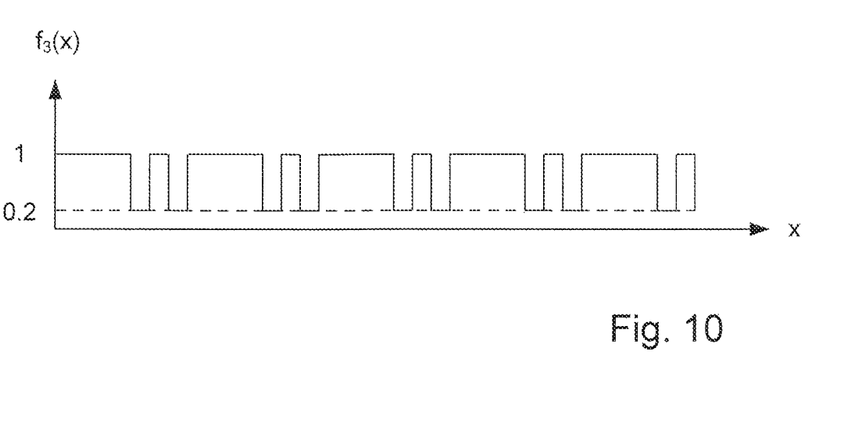
FIG. 10 illustrates a function $f_3(x)$, which represents the amplitude of the reflected light at a reference line, x is the dimension showing the location of the metal electrodes, the metal pillars, and the gaps, according to an embodiment of the invention.

FIG. 10 illustrates a function $f_3(x)$, which represents the amplitude of the reflected light at reference line 402, x is the dimension showing the location of metal electrodes 104, metal pillars 902, and gaps 108, according to an embodiment of the invention. Function $f_3(x)$ differs from function $f_2(x)$. The amplitude reflectance at gaps 108 comprises 0.2, 1, and 0.2. According to the diffraction theory, the intensity of the zero order diffraction beam is given as follows.

$$\text{Intensity of Zero Order} = |\text{Amplitude of Zero Order}|^2 \quad (9)$$

$$[\text{Amplitude of Zero Order}]_3 = \int f_3(x)dx \quad (10)$$

Comparing $f_3(x)$ of FIG. 10 and $f_2(x)$ of FIG. 7, the following result holds.

$$\int f_3(x)dx > \int f_2(x)dx \quad (11)$$

Accordingly, the intensity of zero order of the embodiment having high refractive dielectric materials surrounding metal pillars filling the gaps between the electrodes is higher than the intensity of zero order of the embodiment having only high refractive dielectric materials filling the gaps between the electrodes. In other words, the LCOS panel having high refractive dielectric materials surrounding metal pillars filling the gaps between the electrodes as shown in FIG. 9 has less diffraction as compared with the LCOS panel having only high refractive dielectric materials filling the gaps between the electrodes as shown in FIG. 6.

Figure 11A:
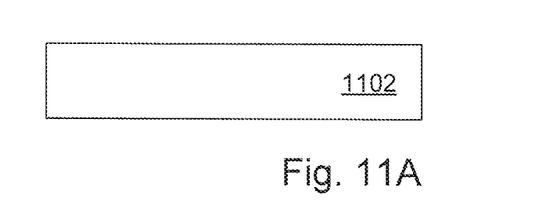
FIG. 11A to FIG. 11L illustrate schematically a process of manufacturing liquid crystal panel having high diffraction ratio, according to an embodiment of the invention.
Figure 11B:
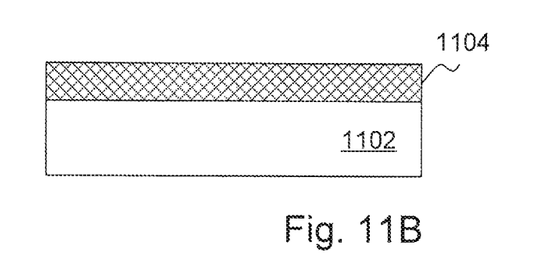
Figure 11C:
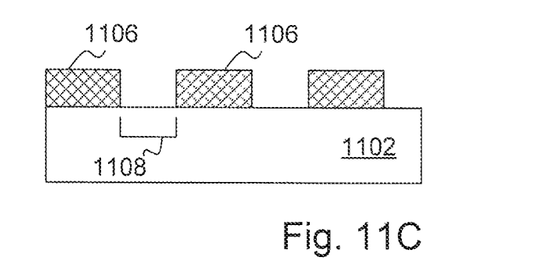

FIG. 11A to FIG. 11L illustrate schematically a process of manufacturing liquid crystal panel having high diffraction ratio, according to an embodiment of the invention. The process starts with a silicon substrate 1102 as shown in FIG. 11A. Silicon substrate 1102 may comprise silicon circuits within substrate 1102. A metal layer 1104 is formed on silicon substrate 1102 as shown in FIG. 11B. For example, the thickness of metal layer 1104 may be 0.3 μm. Metal layer 1104 is etched to form individual electrodes 1106 as shown in FIG. 11C. Each metal electrode is electrically coupled with the circuit within silicon substrate 1102 to form a pixel of the LCOS panel. Each metal electrode is electrically isolated from other metal electrodes. A gap 1108 is formed between adjacent metal electrodes 1106. For example, gap 1108 is 0.2 μm wide.

Figure 11D:
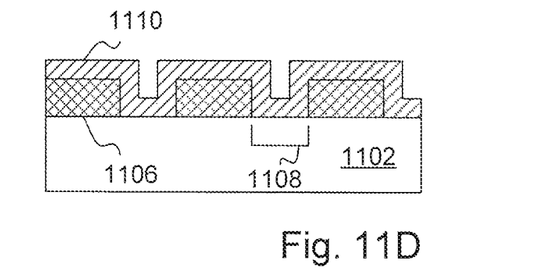
Figure 11E:
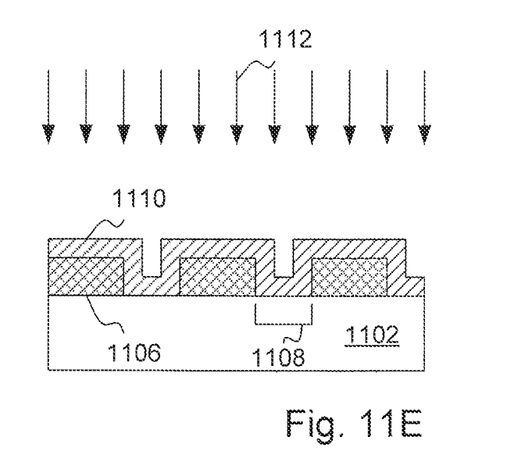
Figure 11F:
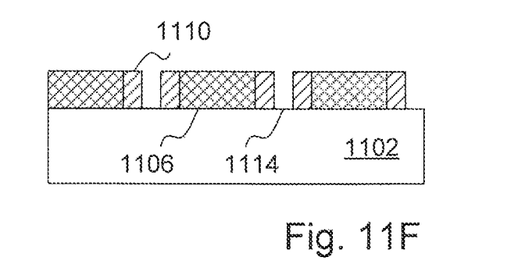
Figure 11G:
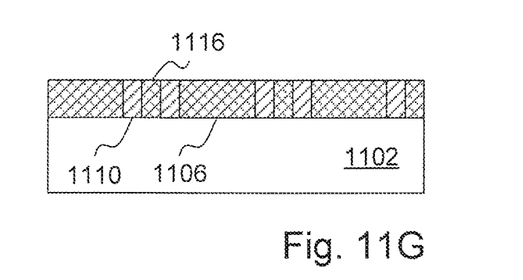

A liner of dielectric material 1110 is formed over metal electrodes 1106 and in gaps 1108 as shown in FIG. 11D. Liner 1110 may be formed using chemical vapor deposition (CVD) or the like. Liner of dielectric materials 1110 is etched by anisotropic etching 1112 as shown in FIG. 11E. After anisotropic etching, liner of dielectric material 1110 remains at the wall of gap 1108 forming a space 1114 surrounded by dielectric material 1110 as shown in FIG. 11F. The horizontal parts of the liner are etched away, only the vertical parts of the liner remain. Space 1114 is filled with metal forming a metal pillar 1116 surrounded by dielectric material 1110 as shown in FIG. 11G. After polishing metal pillars 1116 and after planarization, metal electrodes 1106, dielectric material 1110, and metal pillars 1116 have the same thickness. For example, the thickness may be 0.3 μm.

Figure 11H:
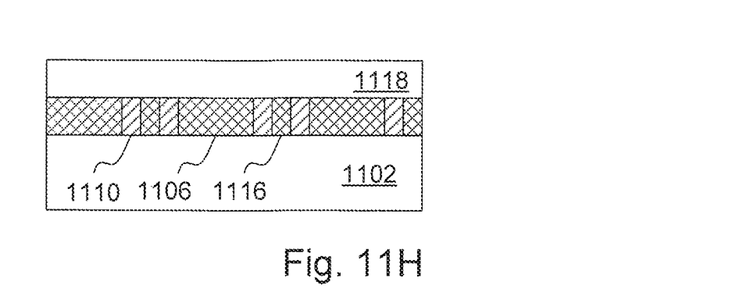
Figure 11I:
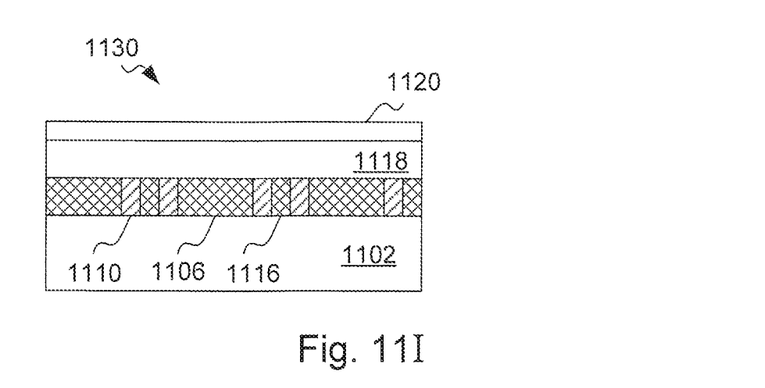

An oxide layer 1118 is disposed on metal electrodes 1106, dielectric material 1110, and metal pillars 1116 as shown in FIG. 11H. For example, the thickness of oxide layer 1118 may be 0.05 μm. The refractive index of dielectric material 1110 is higher than the refractive index of oxide layer 1118. A first liquid crystal alignment layer 1120 is disposed on oxide layer 1118 as shown in FIG. 11I. FIG. 11I shows a silicon backplane 1130 comprising silicon substrate 1102, metal electrodes 1106, high refractive index dielectric material 1110, metal pillars 1116, oxide layer 1118, and first liquid crystal alignment layer 1120. For the sake of simplicity, first liquid crystal alignment layer 1120 is considered a part of silicon backplane 1130.

Figure 11J:
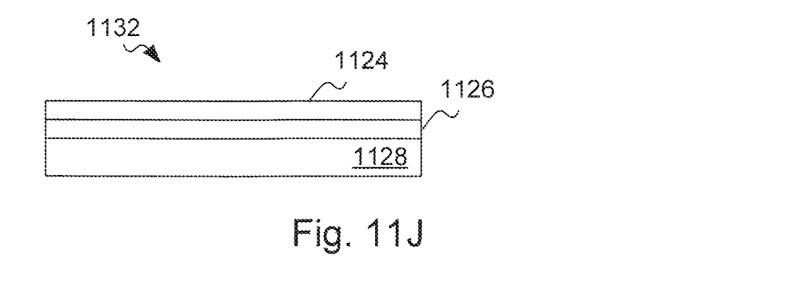
Figure 11K:
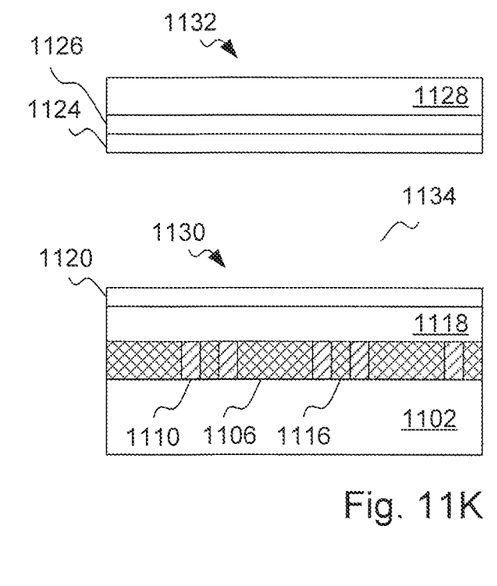
Figure 11L:
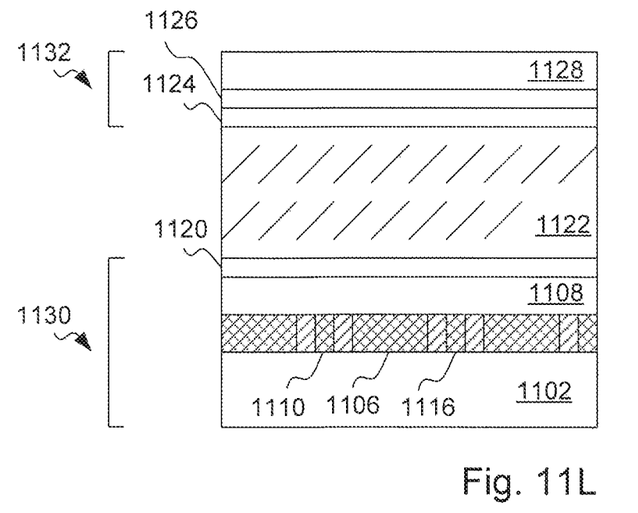

FIG. 11J shows a cover glass 1130 comprising a glass substrate 1128. A transparent continuous electrode 1126 is coated on glass substrate 1128. A second liquid crystal alignment layer 1124 is disposed on transparent continuous electrode 1126. For the sake of simplicity, second liquid crystal alignment layer 1124 is considered a part of cover glass 1130. FIG. 11K shows that cover glass 1132 is turned up side down, and is laminated on silicon backplane 1130 having spacing 1134 between cover glass 1132 and silicon backplane 1130. Second liquid crystal alignment layer 1124 is facing first liquid crystal alignment layer 1120. FIG. 11L shows that a liquid crystal layer 122 is formed by filling liquid crystal in spacing 1134 between cover glass 1132 and silicon backplane 1130. Spacing 1134 is shown in FIG. 11K. For example, the thickness of liquid crystal alignment layers 1120 and 1124 may be 0.025 μm, the thickness of liquid crystal layer 1122 may be 1.1 μm, and the thickness of transparent continuous electrode 1126 may be 0.04 μm.

In an embodiment, the liquid crystal panel may be a single liquid crystal panel. In another embodiment, the liquid crystal panel may be a liquid crystal panel in a wafer comprising multiple liquid crystal panels. Accordingly, in an embodiment, the method of manufacturing the liquid crystal panel may be a method for manufacturing a single liquid crystal panel. In another embodiment, the method of manufacturing the liquid crystal panel may be a method for manufacturing multiple liquid crystal panels of a wafer at the same time.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A liquid crystal on silicon (LCOS) panel comprising:
a silicon substrate having silicon circuit within the silicon substrate;
a plurality of metal electrodes disposed on the silicon substrate, wherein the plurality of metal electrodes are periodically formed on the silicon substrate;
a cover glass comprising a glass substrate and a transparent continuous electrode coated on the glass substrate;
wherein each metal electrode of the plurality of metal electrodes and the transparent continuous electrode form a pixel of the LCOS panel;
a dielectric material disposed in and filling gaps between adjacent metal electrodes; and
an oxide layer disposed on the plurality of metal electrodes and the dielectric material in the gaps between adjacent metal electrodes;
wherein a refractive index of the dielectric material is higher than a refractive index of the oxide layer;
wherein after a planarization process the metal electrodes and the dielectric material in the gaps have the same thickness.

2. The LCOS panel of claim 1, further comprising:
a first liquid crystal alignment layer disposed on the oxide layer;
a liquid crystal layer disposed on the first liquid crystal alignment layer;
wherein the cover glass is disposed on the liquid crystal layer;
a second liquid crystal alignment layer disposed on the transparent continuous electrode of the cover glass; and
wherein the second liquid crystal alignment layer is immediately adjacent to the liquid crystal layer.

3. The LCOS panel of claim 1, wherein the dielectric material is silicon oxynitride.

4. The LCOS panel of claim 1, wherein the oxide layer is made of silicon oxide.

5. The LCOS panel of claim 1, wherein the dielectric material disposed in and filling the gap between adjacent metal electrodes surrounds a metal pillar in the gap.

6. The LCOS panel of claim 5, wherein the metal electrodes, the metal pillar, and the dielectric material have the same thickness.

* * * * *